(12) United States Patent
Müller

(10) Patent No.: US 8,792,092 B2
(45) Date of Patent: Jul. 29, 2014

(54) OPTOELECTRONIC INCLINATION SENSOR

(75) Inventor: Ralf Müller, Mittweida (DE)

(73) Assignee: Sartorius Lab Instruments GmbH & Co. KG (DE)

( * ) Notice: Subject to any disclaimer, the term of this patent is extended or adjusted under 35 U.S.C. 154(b) by 5 days.

(21) Appl. No.: 13/638,139

(22) PCT Filed: Mar. 28, 2011

(86) PCT No.: PCT/EP2011/054741
§ 371 (c)(1),
(2), (4) Date: Sep. 28, 2012

(87) PCT Pub. No.: WO2011/124496
PCT Pub. Date: Oct. 13, 2011

(65) Prior Publication Data
US 2013/0021599 A1     Jan. 24, 2013

(30) Foreign Application Priority Data

Mar. 29, 2010   (DE) .......................... 10 2010 016 183

(51) Int. Cl.
*G01C 11/26*     (2006.01)
*G01C 1/00*      (2006.01)

(52) U.S. Cl.
USPC ................................... 356/139.01; 356/152.2

(58) Field of Classification Search
USPC ....................... 356/39.1, 152.21, 139.1, 152.2
See application file for complete search history.

(56) References Cited

U.S. PATENT DOCUMENTS 6,088,090 A * 7/2000 Hoshi et al. ................. 356/139.1

FOREIGN PATENT DOCUMENTS

| DE | 198 19 610 | 8/1999 | |
|---|---|---|---|
| DE | 20 2004 010 922 | 11/2005 | |
| DE | 20 2007 002 771 | 4/2007 | |
| DE | 10 2005 056 736 | 5/2007 | |
| FR | 2 868 834 | 10/2005 | |
| FR | 2868834 | * 10/2005 | ............... G01C 9/06 |

OTHER PUBLICATIONS

English Language Translation of International Search Report issued in connection with corresponding PCT Application No. PCT/EP2011/054741 issued Jul. 19, 2011 (2 pages total).
"Laserbasierte Strahler-Empfaenger-Baugruppe mit integrierter Mikrooptik zur Messung von Streulicht," Technisches Messen, Edition 75, pp. 662-669 (2008) with English language abstract.

* cited by examiner

*Primary Examiner* — Isam Alsomiri
*Assistant Examiner* — Assres H Woldemaryam
(74) *Attorney, Agent, or Firm* — Mayer & Williams PC; Mark D Wieczorek

(57) ABSTRACT

An optoelectronic inclination sensor determines the inclination of a reference plane relative to the horizontal. A sensor body has a liquid layer, the free surface of which represents a horizon that can be inclined relative to the reference plane, forming an optical boundary to the adjacent medium. A light source disposed below the liquid layer emits a light beam onto the boundary. An optical sensor surface below the liquid layer detects the light beam reflected by the boundary. An analysis unit determines the inclination of the reference plane as a function of the amount of light received by the sensor surface. A deflecting element for deflecting or initially totally reflecting the beam is disposed between the source and the liquid layer. The beam is inclined as a result of said deflection or initial total reflection. A second total reflection occurs at the boundary in both the inclined and non-inclined orientation.

20 Claims, 5 Drawing Sheets

OPTOELECTRONIC INCLINATION SENSOR

BACKGROUND OF THE INVENTION

The invention relates to an optoelectronic inclination sensor for determining the inclination of a reference plane relative to the horizontal, particularly for the simultaneous acquisition of inclinations about two axes according to the preamble of claim 1.

An optical inclination sensor according to the preamble comprises a sensor body which is partially filled with a liquid, wherein the liquid layer provides an optical boundary (for example, liquid/air), which forms a horizon. The reference plane whose inclination is to be determined is formed on the sensor body, for example, as bottom surface. Moreover, a light source for the emission of a light beam which passes through the liquid and is directed onto the boundary is provided. An optical sensor surface, which is used for detecting the light beam reflected by the boundary, is arranged inside or outside of the sensor body. Finally, a processing unit for determining the inclination of the plane as a function of the light quantity received by the optical sensor surface is provided.

DE 198 19 610 C1 describes an optical inclination measuring device, wherein a housing is filled with a transparent liquid which changes the direction of an optical ray beam depending on the inclination. A light source for illuminating a structure or for generating a light point is provided, which directs light beam onto the liquid/air boundary in such a manner that its reflection is incident on a sensor surface and detected there. The optical means for representing the structure or the light point or light spot are arranged on the bottom side of the bottom of the housing or they are a component of said bottom. Moreover, said optical means are formed by a single element which couples light in or out and reproduces the structure or the light point.

From DE 20 2004 010 922 U1, an inclination sensor according to the preamble with a combined glass-liquid prism is known, wherein the light beam undergoes total reflection at the liquid horizon, so that the deflection angle is twice as large as the angle of incidence.

DE 20 2007 002 771 U1 describes a two-axis optical inclination measuring device having an LED as radiation source, a housing with a liquid forming a horizon, a sensor for receiving the radiation as well as optical means with a beam path for representing the radiation on the sensor. The device comprises, moreover, a processing unit for determining the inclination from the signals emitted by the sensor. The optical means form a mark on the sensor, in such a manner that the inclination can be determined in two orthogonal axes from the position of the marks on the sensor. In the case of reflection at the liquid horizon, the radiation should be reflected substantially perpendicularly. In the case of perpendicular impingement of the light beam on the boundary at the liquid horizon, the light is in large part expected not to be reflected, and exits instead at the boundary with varying degrees of refraction.

FR 2 868 834 B1 describes a two-axis inclination sensor, which comprises a sensor body having in sections a spherical shape, in which a liquid forming a horizon is arranged. The sensor body has a light beam source on its rotation axis, which directs a ring light beam onto the liquid surface. Said ring light beam is reflected at the surface and detected by means of sensors. The sensors are arranged outside of the sensor body. The sensor body comprises four windows through which the reflected light beams can impinge on the sensors. The windows are provided either on the bottom side of the sensor body or on the spherical lateral surface. The sensors here embody north-south or east-west axes.

Inclination measuring devices with bubble levels are also known. For a two-dimensional measurement, circular bubble levels are used. An inclination sensor having such a circular bubble level is described, for example, in DE 10 2005 056 736 B4. In the case of a circular bubble level, for the electronic determination of the inclination, an emitter-receiver component assembly is arranged above the glass cover, wherein the light emitted by the emitter is at least partially totally reflected at the glass cover/air bubble boundary when the air bubble is centered. The disadvantage of the bubble level sensors results particularly from the fact that the surface against which the bubble level is applied presents a curvature with a certain radius. The curvature is here adapted to the sensitivity requirements of the bubble level, and it is produced by means of loops, which roughens the surface to a certain extent, as a result of which the gas bubble may tend to bounce, and the accuracy of the sensor is affected. Due to the shape of the gas bubble and the curvature of the glass cover, a nonlinear characteristic line of the sensor is obtained. In addition, the size of the gas bubble is dependent on the temperature of the sensor, which has a disadvantageous effect on the range of application of such sensors.

From the journal "Technisches Messen," Edition 75, 2008, a laser-based emitter-receiver component assembly with integrated micro-optics for measuring scattered light is known. The emitter-receiver component assembly is implemented in a square silicon substrate, in which rotation symmetric photodiode segments have been introduced. The latter surround a central deep etching in which a laser is located. On the silicon substrate, a spacer medium is applied, which consists of a glass that is not permeable for the wavelength of the laser. Above the laser and above the photodiodes, the spacer part is provided with perforations. In this manner, the source and the receiver are optically isolated from each other. The micro-optical system is accommodated in the central area of the perforation. The sensor is completed by an optics carrier. The latter consists, on the one hand, of a carrier made of a chemically resistant material. On the other hand, light impermeable and structurable diaphragms are arranged on the bottom side of this carrier. The micro-optical system is located on this diaphragm structure. It is in the shape of a ring with radially symmetrical aspherical cross section (ring lens).

SUMMARY OF THE INVENTION

The invention is based on the problem of providing an optoelectronic inclination sensor on the basis of a horizon forming liquid, which allows a precise detection of the inclination of a reference plane relative to the horizontal, preferably relative to two axes defining the position of the reference plane unequivocally. The inclination sensor should be robust against environmental influences and its manufacturing cost should be relatively low.

The problem is solved according to the invention by an inclination sensor having the characteristics of claim 1.

An inventive inclination sensor for determining the inclination of a reference plane relative to the horizontal comprises first, in a known manner, a sensor body which is partially filled with a liquid, and which comprises in its interior an optical boundary (for example, liquid/air) forming a horizon. On a surface of the sensor body, the reference plane whose inclination is to be determined is formed. The sensor further comprises at least one light source for emitting a light beam onto the boundary through the liquid. An optical sensor surface for detecting the light beam reflected by the boundary is arranged inside the sensor body. A processing unit determines the inclination of the reference plane as a function of the light quantity received by the optical sensor surface.

According to the invention, between the light source and the liquid, a deflecting element is provided, by which the light beam is totally reflected a first time, before, after passage through the liquid, a second total reflection occurs at the optical boundary.

The advantages of the invention are in particular that, due to the flat impingement of the light beam at the boundary, a nearly complete total reflection is guaranteed. Very little light is lost by scattering or refraction at the boundary, so that an emitter-receiver component assembly can be manufactured cost effectively.

In a particularly preferred embodiment of the invention, the light beam is shaped as a ring light beam. The light beam source preferably comprises a ring lens and/or a ring-shaped diaphragm for shaping the light beam.

In an advantageous embodiment, the light source is arranged in a cavity of a silicon substrate, and oriented perpendicularly to the plane of the sensor. This embodiment can be produced cost effectively using manufacturing methods that are easy to handle.

In an advantageous embodiment variant, the optical sensor surface is formed by at least two photodiodes which are arranged together with the light source on the silicon substrate. By means of appropriate process steps, all the active components can be formed directly on a carrier substrate. Here, the at least two photodiodes are arranged diametrically to the left and right of the light source. In the case of absence of an inclination of the reference plane, the detected light quantity of the two photodiodes is substantially equal, while, in the case of presence of an inclination, the light quantity at the photodiodes can be changed in opposite direction.

In a particularly preferred embodiment, the optical sensor surface is formed by a plurality of segment-shaped photodiodes which are arranged concentrically about the light source. Here, in each case, two diametrically arranged photodiodes form a pair, which delivers a sensor signal. As signal, the difference between the two photocurrents can be used.

If a ring light beam is used, the deflecting element for obtaining the first total reflection preferably has a design with truncated cone shape, and it is arranged centered with the light source, wherein a covering surface of the truncated cone, which is directed to the light source, has a diameter which is smaller than the diameter of the ring beam, and a base surface of the truncated cone, which is directed to the liquid layer, has a diameter which is greater than the diameter of the ring beam, so that the ring beam is reflected completely at the lateral surface of the deflecting element in the direction to the boundary. The angle of the truncated cone is selected here in such a manner that, depending on the media used, at least the critical angle determined using Snell's refraction law is reached as angle of incidence of the light beam.

The deflecting element is formed as a cavity in a light permeable layer in a preferred embodiment. The light permeable layer is here produced preferably from an acrylic glass. On the top side of the light permeable layer, the deflecting element is provided by means of a recess with the shape of a truncated cone. Then, the liquid is arranged in the sensor above this light permeable layer, wherein the liquid also fills the recess in the light permeable layer.

In another preferred embodiment, the cavity in the light permeable layer is filled with a gas or provided with a vacuum. This may occur in such a manner that a thin glass plate is glued, for example, onto the light permeable layer. Any desired liquid can then be arranged above this plate.

Due to the possibility of structuring the layers and due to the already mentioned materials, the sensor can be built up completely on a wafer, allowing the production of particularly small and light sensors.

BRIEF DESCRIPTION OF THE DRAWINGS

The invention and details thereof are further explained below in reference to the drawing.

DETAILED DESCRIPTION

Figure 1:
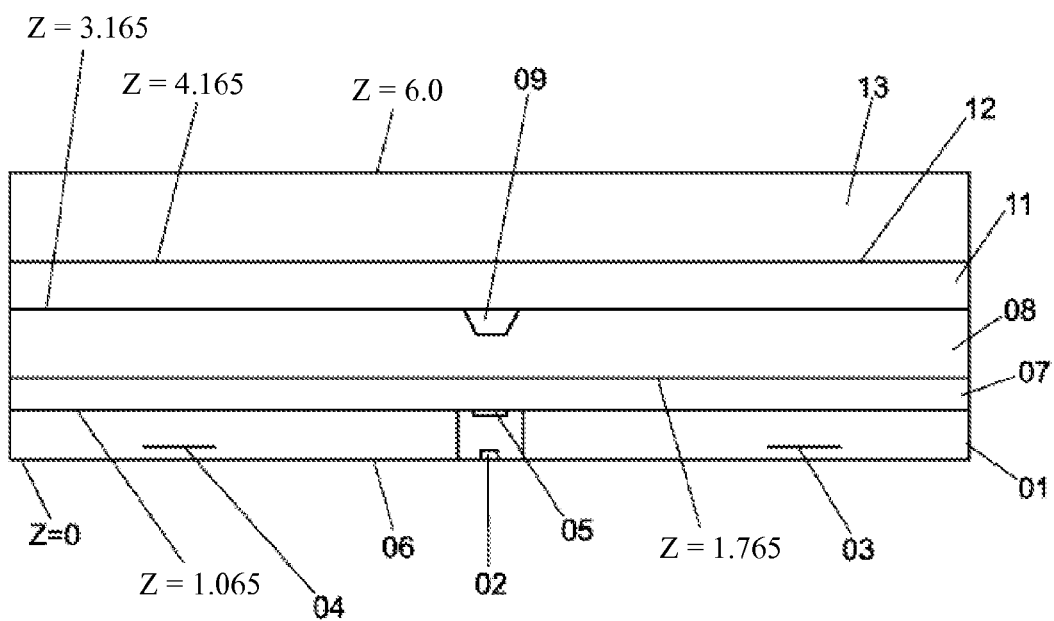
FIG. 1 shows: a first embodiment of an inclination sensor according to the invention with a liquid-filled deflecting element in a cross-sectional layer model.
Figure 1:
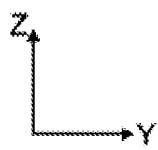

FIG. 1 shows an example of a buildup of a first embodiment of an inclination sensor according to the invention in a cross-sectional layer model. The sensor comprises an optoelectronic emitter-receiver component assembly 01 having an integrated micro-optical system for shaping a ring light beam. The emitter-receiver component assembly is produced from a silicon substrate. In the center of the silicon substrate, a cavity is introduced. A perpendicularly emitting laser 02 is arranged in this cavity, as light source. Diametrically to the laser 02, a first photodiode 03 and a second photodiode 04 are arranged. On the bottom side of the emitter-receiver component assembly 01, a reference plane 06 is formed, the inclination of which relative to the horizontal can be determined by the inclination sensor. For this purpose, the inclination sensor with the reference plane 06 is applied or firmly mounted on the surface or plane to be measured. The inclination of the sensor then corresponds to the inclination of the surface to be measured.

An optically transparent cover layer 07, which is preferably made of Borofloat, is formed above the emitter-receiver component assembly 01. Borofloat is a borosilicate glass with excellent optical properties. The cover layer 07 is used first for protecting the emitter-receiver component assembly 01 and for shaping the desired ring light beam by shaping a ring lens 05, as micro-optical system, on the bottom side of the cover layer 07, and it protrudes into the cavity. On the bottom side of the cover layer 07, light impermeable, structurable diaphragms and lenses can also be provided for further shaping of the ring light beam and for optically separating the sender and the receiver.

However, the special glass of the cover layer 07 is also chemically resistant. It is thus excellently suited for the use of different liquids in the inclination sensor or for optically coupling other layers.

Above the light permeable cover layer 07, an additional light permeable deflecting layer 08 which is preferably made of an acrylic acid is provided. In this light permeable deflecting layer 08, a deflecting element 09 is provided, which is designed, for example, as a cavity in the shape of a truncated cone, in which the light permeable deflecting layer 08 is formed. In modified embodiments, the cover layer 07 and the deflecting layer 08 can be designed as a single piece.

Above the deflecting layer 08, a liquid 11 is located, which forms an optical boundary 12, for example, to an air layer 13. The liquid 11 can be arranged in a container which is elaborated as a laminar recess in the deflecting layer 08. The air layer 13 can be formed by a gas, a vacuum or an additional liquid that is not miscible with the first liquid 11. It is essential here that, due to the different refractive indexes, the optical boundary 12 is present at the surface of the liquid 11, and, due to gravity, it maintains its horizontally oriented position even if the sensor is at an inclination. The sensor represented here functions, for example, with water as liquid 11 and the resulting refractive indexes. However, other liquids can also be used, for example, to achieve a damping of the inclination, due to a higher viscosity (see also FIG. 4).

The inclination sensor is represented in the figures in the horizontal position, so that the reference plane 06 and the boundary 12 are parallel. In FIG. 1, example values are indicated, in order to illustrate the thickness of the individual layers in the Z direction (all indications in mm).

Figure 2:
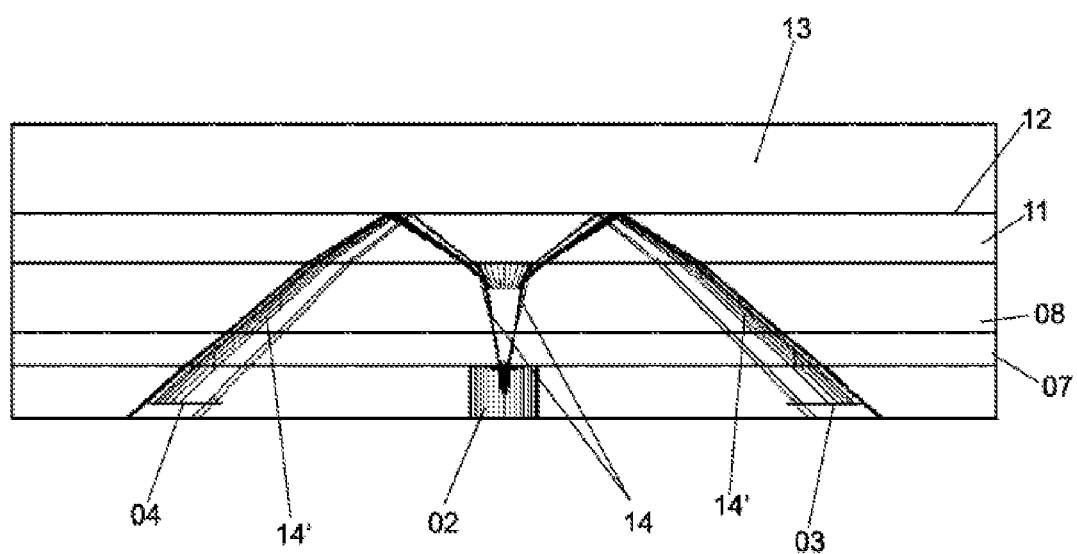
FIG. 2 shows: a beam path in a y-z plane in the horizontal position of a reference plane.
Figure 2:
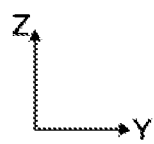

FIG. 2 is a typical beam path in the sensor in the horizontal position, shown in FIG. 1. A ring light beam 14 emitted by the laser 02 and formed by a micro-optical system is totally reflected twice after the transition to the light permeable cover layer 08. The first total reflection occurs at the lateral surface of the deflecting element 09 (boundary: cover layer 08-liquid 11 in the deflecting element 09). The second total reflection occurs at the boundary 12 (liquid 11-air 13). After the second total reflection, the reflected radiation 14' reaches the photodiodes 03, 04 or the other areas of an absorbing bottom in the emitter-receiver unit 01. If the sensor is inclined, the liquid surface changes its position relative to the surface of the first total reflection at the deflecting element 09 or the position relative to the reference plane 06. The result is the measuring effect: The photocurrents of the two photodiodes 03, 04 become disequilibrated by an amount in opposite direction. The difference between the two photocurrents can be used as sensor signal.

It should be pointed out that, in modified embodiments, the first total reflection can be replaced by an optical diffraction or refraction, in order to set the angle of incidence of the light beam on the boundary 12 in such a manner that a total reflection is ensured there in all the operating positions of the sensor. For example, this can be achieved by means of a deflection unit integrated in the micro-optical system of the emitter-receiver unit 01. However, the use of a spatially offset deflecting element allows a particularly flat design, and a small extension of the sensor in the Y direction.

Figure 3:
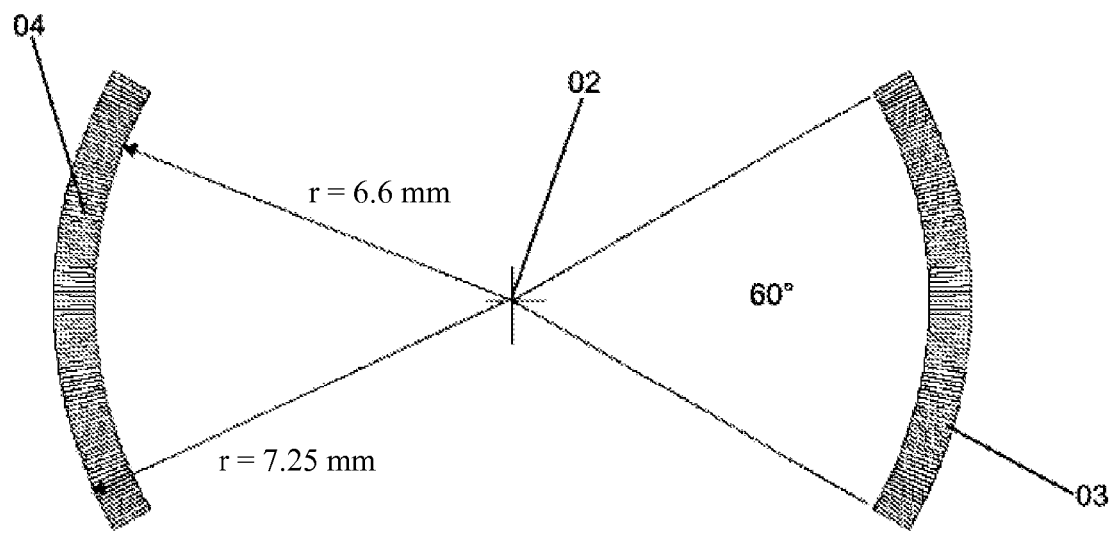
FIG. 3 shows: an embodiment of an optical sensor surface.
Figure 3:
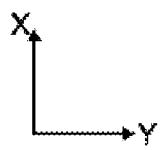

FIG. 3 shows an example of an embodiment of two diametrically arranged sensor elements 03 and 04. The sensor elements 03 and 04 have a design in the shape of a sector. The layout of the two sensor elements 03, 04 was selected in such a manner that the outer radius of the segments corresponds approximately to the radius of the maximum irradiation strength of the ring light beam.

Figure 4:
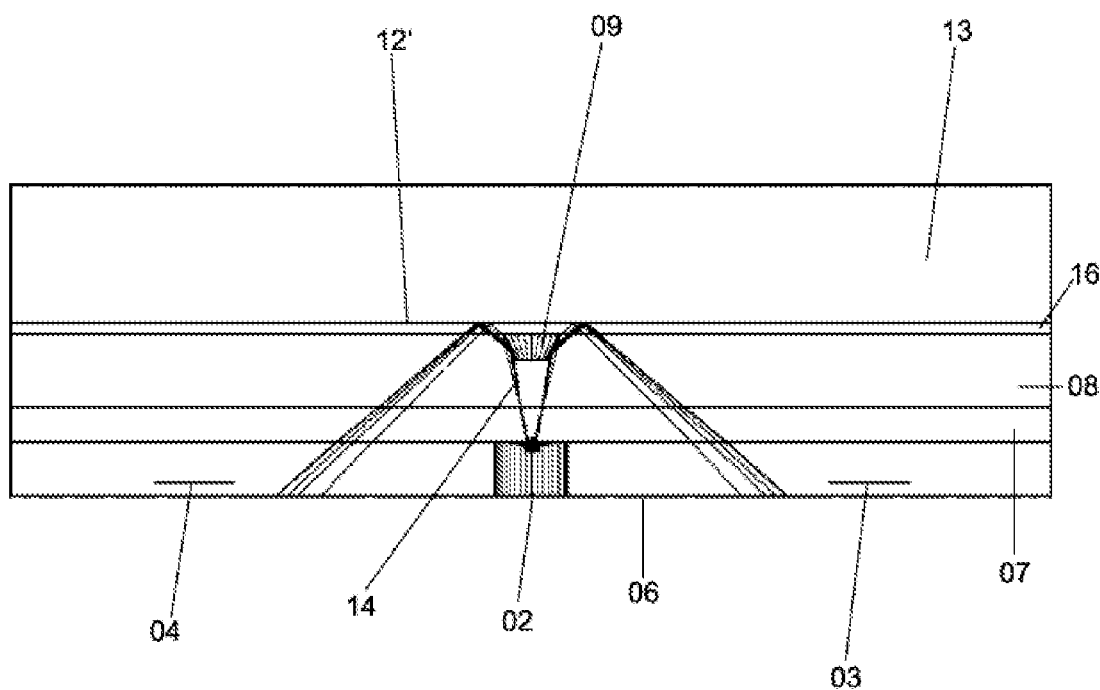
FIG. 4 shows: a second embodiment of a sensor according to the invention with a gas-filled deflecting element.

FIG. 4 shows a modified embodiment of the sensor, in which a liquid having any desired refractive index can be used. For this purpose, the space within the deflecting element 09 is filled with a gas or provided with a vacuum. For this purpose, for example, a thin glass plate 16 is glued onto the deflecting layer 08. Above this glass plate 16, any desired liquid can then be filled in. In the representation shown here, no liquid is included in the drawing. The beam path 14 in FIG. 4 shows that total reflection occurs at the boundary 12' between the glass plate 16 and the air layer 13. Thus, this glass plate can be coated with any desired liquid, and total reflection then occurs at the liquid surface, as well as the desired measurement effect. The horizontal position of the detectors 03, 04 must be adapted to the refractive index of the liquid and to the filling level.

The properties of the liquid, such as the expansion coefficient, freezing point, temperature dependency, refractive index, vapor pressure, viscosity, absorption coefficient, aging and so on have to be taken into consideration and adapted to the given application of the sensor.

Figure 5:
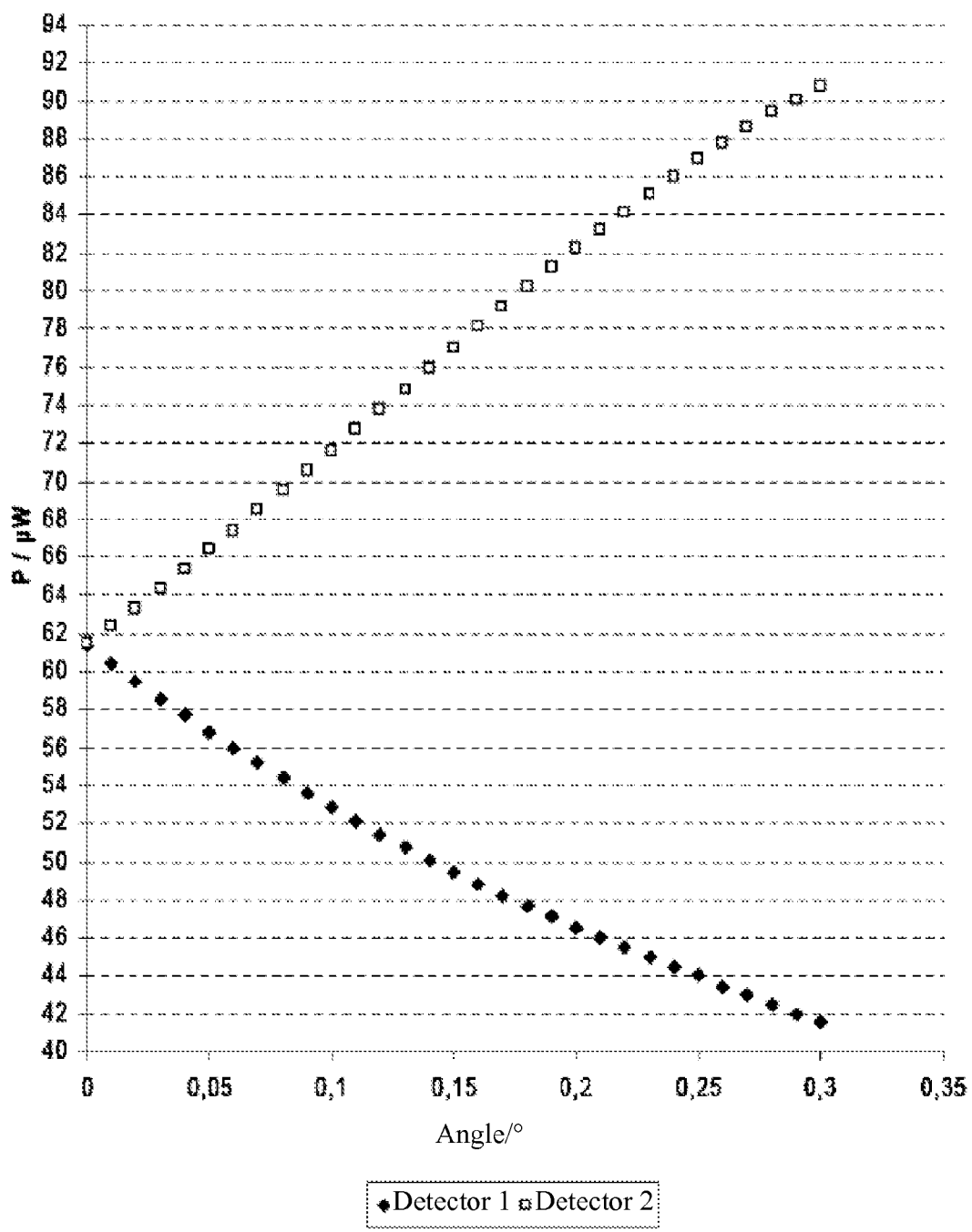
FIG. 5 shows: the course of the detected light quantity on the optical sensor surfaces.

FIG. 5 shows the course of the optical power on the sensor elements 03, 04 over an inclination angle range of 0 to 0.3°. Here, the sensor characteristic line for the inclination was recorded about an axis. The irradiation strength distribution is represented in the plane of the detectors. Here, the bottom curve shows the course of the optical power on the detector 03, while the upper characteristic line shows the course of the optical power on the detector 04. The inclination of the surface 06 here occurs counterclockwise. The laser emits an optical power of 1 mW. In the tared state, each one of the two detectors receives an optical power of approximately 61.4 µW. This corresponds to a photocurrent of 36.84 µA at a sensitivity of 0.6 A/W. In principle, the difference between the photocurrents of the detectors 03 and 04 is suggested as sensor signal. It should be recalled that, using the sensor, the inclinations about the two axes of the reference plane can be determined, in particular by using additional detectors in an arrangement with a 90° rotation.

The invention claimed is:

1. An optoelectronic inclination sensor for determining the inclination of a reference plane relative to the horizontal, comprising:
   a unitary sensor body having a liquid layer whose free surface represents a horizon that can be inclined relative to the reference plane, and forms an optical boundary to the adjacent medium;
   at least one light source arranged beneath the liquid layer, for the emission of a light beam onto the boundary through the liquid layer, wherein the light beam is emitted with a beam axis oriented perpendicularly to the reference plane;
   at least one optical sensor surface arranged beneath the liquid layer for the detection of the light beam reflected by the boundary, and
   a processing unit for determining the inclination of the reference plane as a function of the light quantity received by the optical sensor surface;
   wherein between the light source and the liquid layer, a deflecting layer with a deflecting element for the first total reflection of the light beam is arranged, so that the light beam, as a result of this first total reflection, is inclined relative to the boundary in such a manner that a second total reflection occurs at the boundary, in both the inclined and also in the non-inclined position,
   and such that at least the optical sensor surface, the deflecting layer, and the liquid layer are disposed within the unitary sensor body.

2. The inclination sensor according to claim 1, wherein the light beam is shaped as a ring light beam.

3. The inclination sensor according to claim 1, wherein the light source comprises a ring lens and/or a ring-shaped diaphragm for shaping the light beam.

4. The inclination sensor according to claim 1, wherein the light source is arranged in a cavity of the silicon substrate.

5. The inclination sensor according to claim 1, wherein the optical sensor surface is formed by at least two photodiodes, which are arranged together with the light source on a silicon substrate.

6. The inclination sensor according to claim 5, wherein the detected light quantity of the two photodiodes, in the case of absence of an inclination of the reference plane, is substantially equal, while in the presence of an inclination, the inclination occurring in a first direction, the light quantity of the photodiodes becomes disequilibrated by an amount in a direction opposite that of the first direction.

7. The inclination sensor according to claim 5, wherein the optical sensor surface is formed by a plurality of segment-shaped photodiodes, which are arranged concentrically about the light source, wherein in each case two diametrically arranged photodiodes deliver a sensor signal.

8. The inclination sensor according to claim 1, wherein the deflecting element is formed by a cavity in the light permeable deflecting layer.

9. The inclination sensor according to claim 8, wherein the light beam is shaped as a ring light beam, and wherein the deflecting element is in the shape of a truncated cone, wherein a cover surface of the truncated cone, which is directed to the light source, has a diameter which is smaller than the diameter of the ring light beam, and a base surface of the truncated cone, which is directed to the liquid layer, has a diameter which is greater than the diameter of the ring light beam.

10. The inclination sensor according to claim 9, wherein the cavity is filled with a gas, a vacuum or a liquid, in particular with the liquid forming the liquid layer.

11. The inclination sensor according to claim 6, wherein the optical sensor surface is formed by a plurality of segment-shaped photodiodes, which are arranged concentrically about the light source, wherein in each case two diametrically arranged photodiodes deliver a sensor signal.

12. The inclination sensor according to claim 2, wherein the deflecting element is formed by a cavity in the light permeable deflecting layer.

13. The inclination sensor according to claim 3, wherein the deflecting element is formed by a cavity in the light permeable deflecting layer.

14. The inclination sensor according to claim 4, wherein the deflecting element is formed by a cavity in the light permeable deflecting layer.

15. The inclination sensor according to claim 5, wherein the deflecting element is formed by a cavity in the light permeable deflecting layer.

16. The inclination sensor according to claim 6, wherein the deflecting element is formed by a cavity in the light permeable deflecting layer.

17. An inclination sensor according to claim 7, wherein the deflecting element is formed by a cavity in the light permeable deflecting layer.

18. The inclination sensor according to claim 11, wherein the deflecting element is formed by a cavity in the light permeable deflecting layer.

19. The inclination sensor according to claim 2, wherein the light source is arranged in a cavity of the silicon substrate.

20. The inclination sensor according to claim 3, wherein the light source is arranged in a cavity of the silicon substrate.

* * * * *